US009460296B2

United States Patent
Walton et al.

(10) Patent No.: US 9,460,296 B2
(45) Date of Patent: Oct. 4, 2016

(54) SYSTEMS, METHODS AND MEDIA FOR SELECTIVE DECRYPTION OF FILES CONTAINING SENSITIVE DATA

(71) Applicant: AppSense Limited, Warrington (GB)

(72) Inventors: Travis Walton, Bolton (GB); Paul Delivett, Runcorn (GB)

(73) Assignee: APPSENSE LIMITED, Warrington (GB)

( * ) Notice: Subject to any disclaimer, the term of this patent is extended or adjusted under 35 U.S.C. 154(b) by 29 days.

(21) Appl. No.: 13/946,770

(22) Filed: Jul. 19, 2013

(65) Prior Publication Data
US 2015/0026460 A1    Jan. 22, 2015

(51) Int. Cl.
*G06F 21/60*    (2013.01)
*G06F 21/62*    (2013.01)

(52) U.S. Cl.
CPC ......... *G06F 21/602* (2013.01); *G06F 21/6218* (2013.01)

(58) Field of Classification Search
CPC ........... H04L 9/00; H04L 9/30; G06F 12/16; G06F 21/602; G06F 21/6218
USPC ...................... 713/168, 165; 380/28, 45, 277
See application file for complete search history.

(56) References Cited

U.S. PATENT DOCUMENTS

| | | | | |
|---|---|---|---|---|
| 6,378,071 B1 * | 4/2002 | Sasaki | ............... | G06F 17/30067 707/E17.005 |
| 2003/0200432 A1 | 10/2003 | Washio | | |
| 2004/0186861 A1 | 9/2004 | Phatak | | |
| 2006/0005255 A1 | 1/2006 | Lipsky et al. | | |
| 2006/0143084 A1 | 6/2006 | Donnelli et al. | | |
| 2007/0260881 A1 * | 11/2007 | Krasnyanskiy | ..... | G06F 21/6218 713/165 |
| 2008/0307175 A1 * | 12/2008 | Hart | .................... | G06F 11/1461 711/162 |
| 2012/0272061 A1 * | 10/2012 | Molau | ................. | G06F 21/6227 713/165 |
| 2013/0117811 A1 * | 5/2013 | Phillips | ............... | G06F 21/6218 726/1 |

OTHER PUBLICATIONS

Search Report mailed on Jan. 23, 2015 for related GB Application No. 1412800.3; 3 pages.

* cited by examiner

*Primary Examiner* — Jeffrey Pwu
*Assistant Examiner* — Samuel Ambaye
(74) *Attorney, Agent, or Firm* — Wilmer Cutler Pickering Hale and Dorr LLP (57) ABSTRACT

Systems, methods and media are provided for selective decryption of files. One method includes monitoring a secure file storage area including at least one file using a selective decryption process associated with the secure file storage area. Content of each of the at least one file is protected with an encryption. The method also includes detecting a request by an application program for one of the at least one file. The method further includes determining whether the application program needs to access the content of the requested file. The method also includes, when it is determined that the application program does not need to access the content of the requested file, allowing the application program to access the file content without decrypting the encryption.

14 Claims, 3 Drawing Sheets

SYSTEMS, METHODS AND MEDIA FOR SELECTIVE DECRYPTION OF FILES CONTAINING SENSITIVE DATA

TECHNICAL FIELD

Disclosed systems, methods and media relate to selective decryption of files. Specifically, disclosed systems, methods and media relate to selective decryption of files containing sensitive data that are stored in a secure file storage area.

BACKGROUND

Certain application programs (e.g., a backup daemon, file directory management program, etc.) running on a computing device ("application processes") have a need to read from, and write to, both insecure and secure storage areas that are at, or coupled to, the computing device during the lifetime of the application processes. This can cause a problem for the security subsystem of the computing device that would normally prevent a non-secure application program from accessing (e.g., reading from, writing to, moving) files in the secure storage area.

SUMMARY

In accordance with the disclosed subject matter, systems, methods and media are provided for selective decryption of files. Specifically, disclosed systems, methods and media provide for selectively decrypting one or more files containing sensitive data/information that are stored in a secure file storage area. For example, the disclosed subject matter provides a method that includes monitoring a secure file storage area including at least one file using a selective decryption process associated with the secure file storage area. Content of each of the at least one file is protected with an encryption. The method also includes detecting a request by an application program for one of the at least one file. The method further includes determining whether the application program needs to access at least a part of the content of the requested file. The method also includes allowing the application program to access the content of the requested file without decrypting the encryption when it is determined that the application program does not need to access at least a part of the content of the requested file.

In one embodiment, the method may also include decrypting the encryption using the selective decryption process when it is determined that the application program does need to access at least a part of the content of the requested file and allowing the application program to access the decrypted file content. The method may further include detecting a write-request by the application program for writing the decrypted file content to an unsecure location outside of the secure file storage area and re-encrypting the decrypted file content using the selective decryption process before the file content is written to the unsecure location.

In one embodiment, the application program may be a word-processing application, an image-processing application, a spreadsheet application, or a multi-media processing application, and the application can be used to open the requested file and display the decrypted file content. In one embodiment, the secure file storage area may be one or more file folders, one or more segments of a disk, or one or more blocks of memory. In one embodiment, the selective decryption process is configured to encrypt content of a file when the file is initially saved in the secure file storage area.

In one embodiment, the secure file storage area may be one or more file folders, one or more segments of a disk, or one or more blocks of memory. In one embodiment, the secure file storage area is communicatively coupled to a computing device running the selective decryption process. In one embodiment, the selective decryption process may be a file system driver including one or more kernel components, one or more user-level application components, or a combination of kernel components and user-level application components. In one embodiment, the secure file storage area is located at a cloud storage client device running the selective decryption process and the method may further include receiving, at the cloud storage client device, one or more of the at least one file from a cloud storage server over a communication network.

The disclosed subject matter also includes an apparatus comprising one or more interfaces configured to provide communication with at least one computing device over a network and a processor. The apparatus also includes a secure file storage area including at least one file. The processor is in communication with the one or more interfaces and the secure file storage area and configured to run a selective decryption module stored in memory. The selective decryption module is in turn configured to monitor the secure file storage area, wherein content of each of the at least one file is protected with an encryption. The selective decryption module is also configured to detect a request by an application program for one of the at least one file and determine whether the application program needs to access at least a part of the content of the requested file. The selective decryption module is further configured to allow the application program to access the content of the requested file without decrypting the encryption when it is determined that the application program does not need to access at least a part of the content of the requested file.

The disclosed subject matter further includes a non-transitory computer readable medium. The computer readable medium includes executable instructions operable to cause an apparatus to monitor a secure file storage area that is coupled to the apparatus and includes at least one file. Content of each of the at least one file is protected with an encryption. The executable instructions are also operable to cause the apparatus to detect a request by an application program for one of the at least one file and determine whether the application program holds an access privilege for accessing the requested file. When it is determined that the application program holds the access privilege for accessing the requested file, the executable instructions are further operable to cause the apparatus to further determine whether the application program needs to access at least a part of the content of the requested file by checking a list of application programs that need to access the content of the requested file. The executable instructions are further operable to cause the apparatus to allow the application program to access the content of the requested file by providing a copy of the requested file to the application program without decrypting the encryption when it is determined that the application program is not in the list.

When it is determined that the application program is included in the list, the executable instructions are also operable to cause the apparatus to decrypt the encryption and allow the application program to access the decrypted file content. The executable instructions are further operable to cause the apparatus to detect a write-request by the application program for writing the decrypted file content to an unsecure location outside of the secure file storage area and re-encrypt the decrypted file content before the file content is written to the unsecure location in such way that the application program is unaware of the re-encryption of the decrypted file content.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto.

In this respect, before explaining at least one embodiment of the disclosed subject matter in detail, it is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the disclosed subject matter. It is important, therefore, that the claims be regarded as including such equivalent constructions insofar as they do not depart from the spirit and scope of the disclosed subject matter.

These together with the other objects of the disclosed subject matter, along with the various features of novelty which characterize the disclosed subject matter, are pointed out with particularity in the claims annexed to and forming a part of this disclosure. For a better understanding of the disclosed subject matter, its operating advantages and the specific objects attained by its uses, reference should be had to the accompanying drawings and descriptive matter in which there are illustrated preferred embodiments of the disclosed subject matter.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In the following description, numerous specific details are set forth regarding the systems, methods and media of the disclosed subject matter and the environment in which such systems, methods and media may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems, methods and media that are within the scope of the disclosed subject matter.

The disclosed subject matter relates to systems, methods and media for selective description of files. Specifically, the disclosed systems, methods and media are provided for selectively decrypting files containing sensitive data/information that are contained in a secure file storage area.

In one embodiment, for example, a file server is coupled to a disk system having a set of disks and runs a disk backup daemon process. Some of the disks include secure file storage areas, such as secure file directories, that contain files that are protected using at least one encryption. The secure file storage areas are monitored by an instance of a selective decryption module running on the file server ("selective decryption process"). The disk backup daemon process is scheduled to back up to backup tapes every file stored in the file directories of the disk system at 12 midnight each day. At 12 midnight each day, the backup daemon process wakes up and backs up one directory at a time by copying all the files in the directory to one or more backup tapes. When the backup daemon process reaches a secure file directory, the selective decryption process monitoring the secure file directory detects that the backup daemon process is about to copy the encrypted files stored in the secure file directory and move the copies to an unsecure storage location (i.e., backup tapes).

The selective decryption process determines whether the backup daemon process needs to access the content of the files, e.g., by checking a list of application programs that need to access the content of the files in the particular secure file directory. When the selective decryption process learns that the backup daemon process is not included in the list, the selective decryption process, instead of preventing the backup daemon process from backing up the encrypted files in the secure file directory, or decrypting the encrypted files to allow the backup daemon process to proceed with the daily backup of the files, makes the encrypted files in the secure file directory available for the daily backup without decrypting the encryption of the files, thereby allowing the files in the secure file directory to be backed up properly but without compromising the security of the sensitive information/data contained in the encrypted files. The backup daemon process copies the encrypted files as-is (i.e., without decryption), moves the copies to backup tapes and proceeds to back up the next file directory.

Because it is not decrypted before being copied and moved to backup tapes, no program can access the encrypted content of the backed up files—i.e., the sensitive information contained in the file won't be accessible. If another application program tries to open the file, for example, the application program may either receive an error message, be disabled, or crash. If the backed up files are restored to the secure file directory, however, the encrypted files may be again made available for authorized application programs that are included in the list.

In another embodiment, a National Aeronautics and Space Administration (NASA) research scientist wants to send an email with an attached file including a word-processing document to an engineer working at a private company for a join research project that is supported by NASA and the private company. The research scientist opens an email application (e.g., Microsoft Outlook™, etc.), prepares an email and attempts to attach to the email an encrypted file that is stored at a secure file directory. The selective decryption process monitoring the secure file directory in a file server located at a NASA research center detects that the email application attempts to copy an encrypted file in the secure file directory and move the file to an unsecure storage location (e.g., a memory location accessible by the email application).

The selective decryption process checks, e.g., the file server's registry, to determine whether the email application needs to access the encrypted file in the secure file directory and learns that the email application does not need to access the encrypted files in the secure file directory. The selective decryption process provides without decryption the encrypted file for the email application to attach the encrypted file to the scientist's email. The scientist's email is sent and successfully delivered to the intended engineer's inbox. When the engineer opens the email and attempts to read the attached file, a word-processing application program that can handle the type of the attached file (e.g., Microsoft Word™, if the attached file is a Word document) is invoked. However, the word-processing application program cannot open the file to display the file's content because of the encryption that protects the file content and thus displays an error message instead.

Upon reading the error message, the engineer realizes that it is an encrypted file and saves the attached file to a secure file directory that his company created at its file server as a part of the joint research agreement it made with NASA. After the attached file is saved at the secure file directory, the engineer attempts to open the file again using the word-processing application program. The selective decryption process monitoring the private company's secure file directory checks to determine whether the word-processing application program needs to access the content of the file and learns (e.g., by checking a file including a list of application programs that need to access the file content) that the word-processing program needs to access the encrypted content of file. The selective decryption process decrypts the file and allows the word-processing application program to read and display the content of the document for the engineer. It should be noted, however, that if the engineer attempts to save the document outside the secure file directory after successfully opening the document, the selective decryption process would again encrypt the file before the file is saved outside the secure file directory.

Figure 1:
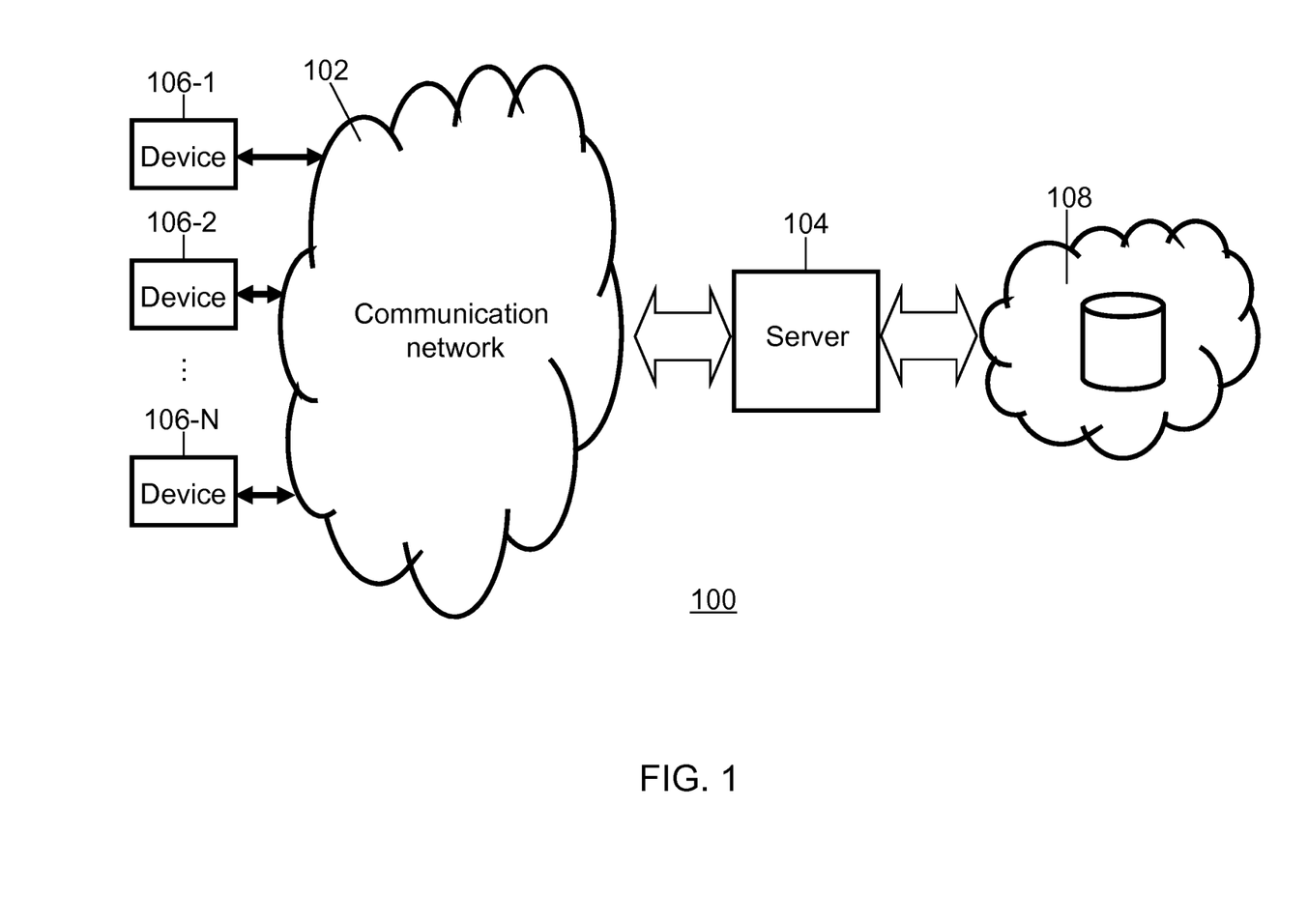
FIG. 1 illustrates a diagram of a networked communication system in accordance with an embodiment of the disclosed subject matter.

FIG. 1 illustrates a diagram of a networked communication arrangement 100 in accordance with an embodiment of the disclosed subject matter. Networked communication arrangement 100 can include a communication network 102, a server 104, at least one client device 106 (e.g., client devices 106-1, 106-2, . . . 106-N), and a database 108.

Each client device 106 can send data to, and receive data from, server 104 over communication network 102. Each client device 106 can be directly coupled to server 104; alternatively, each client device 106 can be connected to server 104 via any other suitable device(s), communication network(s), or combination thereof. For example, each client device 106 can be coupled to server 104 via one or more routers, switches, access points, and/or communication networks (as described below in connection with communication network 102).

A client device 106 can include a desktop computer, a mobile computer, a tablet computer, a cellular device, a smartphone or any computing system that is capable of performing computation and runs one or more client software programs. For example, a client device 106 can be a mobile station running a selective decryption module that can interact with files in a secure file storage area. In some embodiments, the secure file storage area is coupled to server 104. Server 104 can be a single server, a network of servers, or a farm of servers in a data center.

Communication network 102 can include a network or combination of networks that can accommodate private data communication. For example, communication network 102 can include a local area network (LAN), a virtual private network (VPN) coupled to the LAN, a private cellular network, a private telephone network, a private computer network, a private packet switching network, a private line switching network, a private wide area network (WAN), a corporate network, or any number of private networks that can be referred to as an Intranet. Such networks may be implemented with any number of hardware and software components, transmission media and network protocols. FIG. 1 shows communication network 102 as a single network; however, communication network 102 can include multiple interconnected networks listed above.

Server 104 can be coupled to one or more database systems. Database 108 can include at least one of two types of database: a local database and a remotely located database. Database 108 can include any data supported by one or more of data structures; alternatively, it could include one or more database management system (DBMS) or a distributed database. For example, database 108 may include a data structure, or one or more data tables in a DBMS, for storing information related to one or more secure file storage areas and files contained in the secure file storage areas. Database 108 can also include at least one of a relational database, object database (a.k.a., object-oriented database), XML database, cloud database, active database, and a data warehouse. Database 108 may include at least one physical, non-transitory storage medium.

In some embodiments, database 108 can be provided as an enterprise system in a corporate environment For example, communication network 102, server 104, client devices 106, and database 108 can be located in a close proximity and can be a part of a single company. In some cases, server 104, client devices 106, and database 108 can be located in the same building and can be coupled to one another via a local communication network. The local communication network can include a local area network (LAN), a corporate network, and a virtual private network (VPN) associated with the corporate network. FIG. 1 shows database 108 as separate from communication network 102. However, database 108 can be a part of communication network 102 or another communication network.

Figure 2:
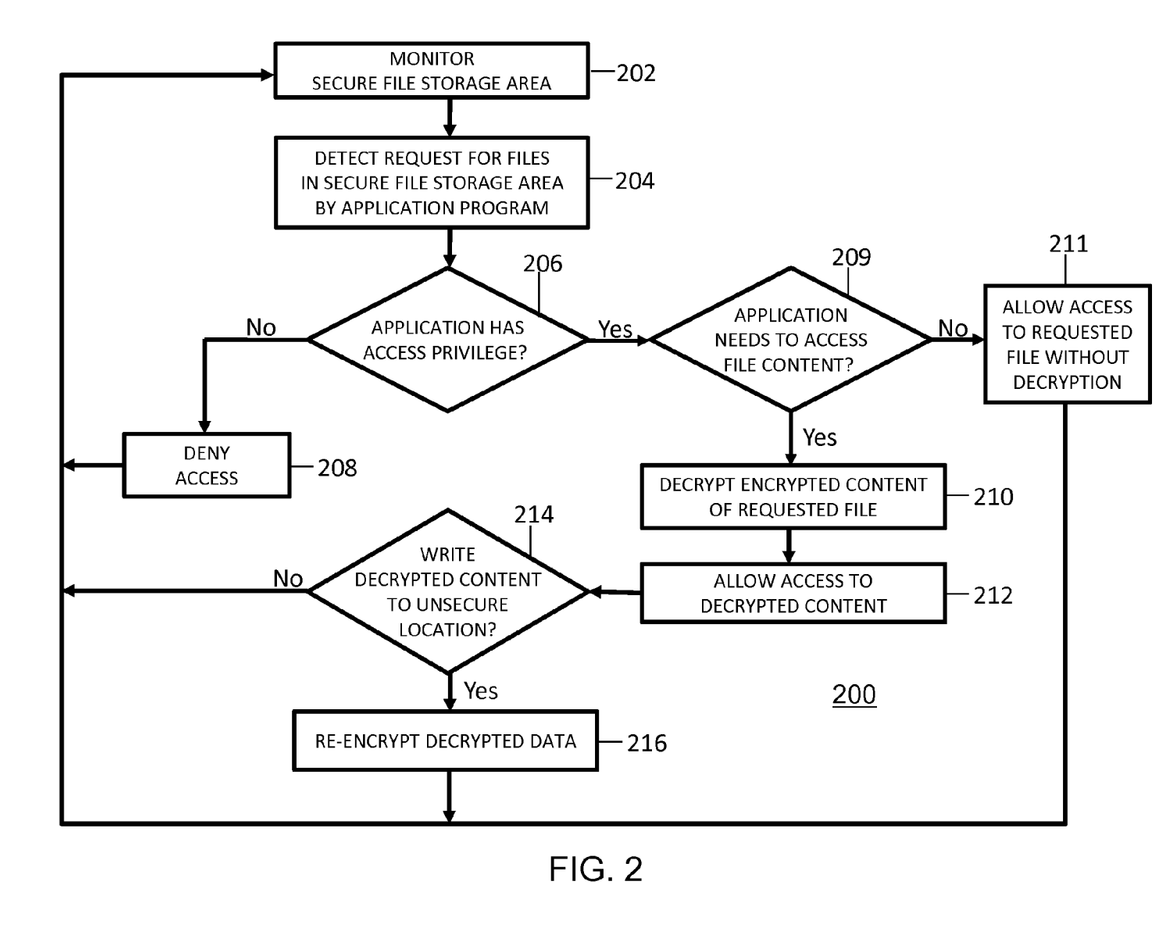
FIG. 2 is a flow diagram for selective decryption of files in a secure file storage area in accordance with certain embodiments of the disclosed subject matter.

FIG. 2 is a flow diagram 200 for selective decryption of files in a secure file storage area in accordance with certain embodiments of the disclosed subject matter. At 202, a secure file storage area including one or more files that each includes encrypted content, or data, is monitored. For example, an instance of a selective decryption module (selective decryption process) running on a computing device (e.g., server 104 or client device 106) may monitor the secure file storage area for file activities (e.g., reading, writing, copying, moving, etc.). In some embodiments, the secure file storage area may reside in, or is connected to, the computing device. The secure file storage area may also be communicatively coupled to the computing device over a communication network.

In some embodiments, the secure file storage area includes one or more file folders. The secure file storage area may also include one or more segments of a disk, one or more blocks of memory, or a combination of disk segments and memory blocks. In some embodiments, the secure file storage area includes a cloud storage area, such as a cloud storage directory.

At 204, a request for one or more files in the secure file storage by an application program is detected. For example, the selective decryption process monitoring a secure file storage area may detect a request made by an application program for one or more files included in the secure file storage area. For instance, the selective decryption process may detect a request by a file manager (e.g., Microsoft Windows Explorer™, Apple Mac OS Finder™) for a file in the secure file storage area, e.g., in order to make a copy of the file and move the copy to a new file directory.

In some embodiments, the selective decryption process is a file system driver including one or more kernel components. The file system driver may also include one or more user-level application components. In some embodiments, the file system driver may be implemented using only the user-level application components. In some embodiments, the selective decryption module is a subcomponent of a cloud storage module, such as cloud storage server module and cloud storage client module. In some embodiments, the selective decryption process is associated with one or more specifically designated secure file storage areas.

At 206, it is determined whether the application program making a request for the file(s) has an access privilege for accessing the requested file(s). For example, the selective decryption process, having detected a file request from the application program, may determine whether the application program holds an access privilege for accessing the requested file(s). In some embodiments, the selective decryption process makes the determination by referencing a list of application programs having a privilege to access the files stored in the secure file storage area. In some embodiments, the list including the privileged application programs is also stored in the secure file storage area. The list, in other embodiments, may be cached elsewhere (e.g., a memory location, a different file folder, etc.).

For instance, the selective decryption process, having detected a file manager's request for a file in the secure file storage area, may reference a list including names, or other types of identifications, of the privileged applications stored in the secure file storage area to determine whether the file manager is included in the list. In some embodiment, the privileged application programs included in a list may have access to only some of the files that are stored in a secure file storage area. In some embodiments, there may be more than one list of privileged application programs, each list providing a different set of application programs holding an access privilege for accessing a different set of files in one or more secure file storage areas.

If it is determined at 206 that the file-requesting application program does not hold a privilege to access the requested file(s), the application program is denied access to the requested file(s) at 208. If, for instance, the selective decryption process references a list of privileged application programs having access to the requested file and learns that the file manager is not included in the list, the selective decryption process denies the file manager access to the requested file.

If, however, it is determined at 206 that the file-requesting application program does hold a privilege to access the requested file(s), the selective decryption process further determines at 209 whether the application program needs to access, or interpret, the encrypted content of the requested file. For example, the selective decryption process may determine whether the application program needs to read or modify the content of the requested file. In some embodiments, the selective decryption process makes the determination by referencing a list of application programs that need to access the content of the files stored in the secure file storage area. The list may be stored within the secure file storage area. It may also be cached elsewhere (e.g., a different file folder, system registry, etc.).

If it is determined at 209 that the file-requesting application program does not need to access, or interpret, the encrypted content of the requested file, the application program is allowed to access the content of the requested file as-is—i.e., without decrypting the encryption that protects the requested file content—at 211. For example, the selective decryption process may provide a copy of the requested file to the application program without decrypting the encrypted content of the requested file. The application program, however, is oblivious of the encryption status of the file and is simply allowed to use (e.g., move to a backup tape or attach to an email) the copy of the requested file.

If, however, it is determined at 209 that the application program does need to access the content of the requested file, the selective decryption process decrypts the encrypted content of the requested file at 210. At 212, the application program is allowed to access the decrypted content of the requested file. For example, the selective decryption process, having decrypted the encrypted content of the requested file (e.g., data included in the requested file), can provide the application program access to the decrypted content (e.g., data). For instance, a selective decryption process, having detected a request made by a word-processing application for a document file in a secure file storage area and determined that the word-processing application has a privilege to access the requested file and needs to access the encrypted document included in the requested file, decrypts the encrypted document and allow the word-processing application to access (e.g., read, modify) the decrypted document.

At 214, it is determined whether the application program has made a request to write the decrypted content, or data, to an unsecure location outside the secure file storage area. For instance, the selective decryption process can determine whether the word-processing application, having gained access to the decrypted document included in the requested file, made a request to write the decrypted document to an unsecure location (e.g., unprotected, ordinary file directory or an external disk or memory card).

If it is determined at 214 that the application program has made a request to write the decrypted content/data to an unsecure location, the decrypted content/data is re-encrypted at 216 before the data is written to the unsecure location. For instance, the selective decryption process can re-encrypt the decrypted document before the word-processing application saves the document to, e.g., an unprotected file directory, or an external memory card. In some embodiments, the selective decryption process returns to 202 to continue monitoring the secure file storage area.

Figure 3:
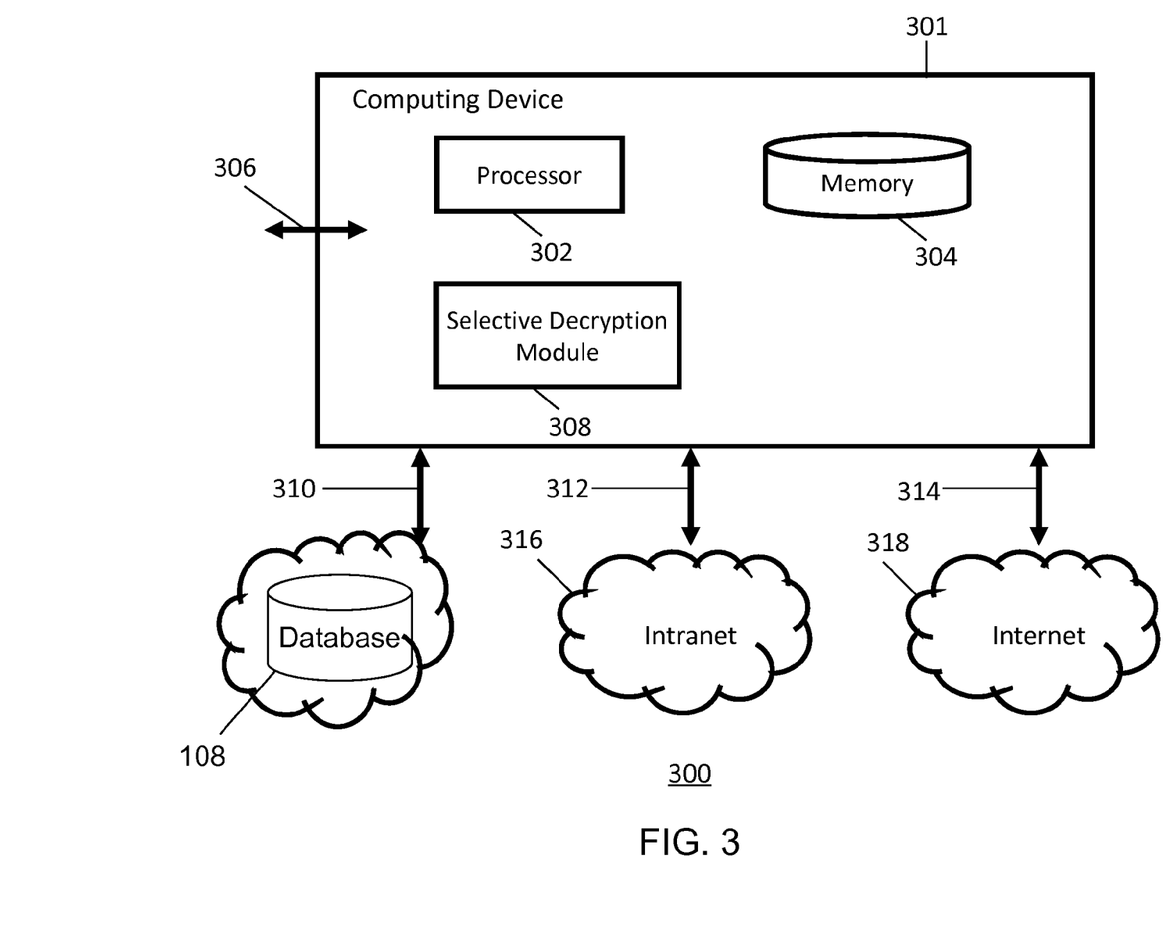
FIG. 3 is a block diagram of a computing device in accordance with certain embodiments of the disclosed subject matter.

FIG. 3 is a block diagram 300 of a computing device 301 in accordance with certain embodiments of the disclosed subject matter. Block diagram 300 shows a computing device 301 (e.g., server 104, client device 106), which includes a processor 302, a memory 304, interfaces 306, 310, 312, and 314, and a selective decryption module 308. Block diagram 300 shows computing device 301 communicatively coupled to a database 108, an Intranet 316, and the Internet 318. Memory 304 and interfaces 306, 310, 312, and 314 are communicatively coupled to processor 302.

Computing device 301 can communicate with other computing devices (not shown) via interface 306; computing device 301 can communicate with database 108 via interface 310; computing device 301 can communicate with Intranet 316 via interface 312; and computing device 301 can communicate with the Internet 318 via interface 314. Interfaces 306, 310, 312, and 314 are shown as separate interfaces but may be the same physical interface. Processor 302 can run software programs and modules, including selective decryption module 308. Memory 304 is capable of storing data that can be used by processor 302 to run the software programs and modules. For example, memory 304 may include a secure file storage area including a plurality of files. In some embodiments, database 108 also includes one or more secure file storage areas.

Selective decryption module 308 can be configured to communicate, or interact, with one or more other computing devices (e.g., server 104 or client device 106) through interface 306 for selective decryption of files. For example, selective decryption module 308 can monitor the secure file storage area, wherein content of each of the at least one file is protected with an encryption. Selective decryption module 308 can also detect a request by an application program for one of the at least one file and determine whether the application program needs to access, or interpret, the content of the requested file. Selective decryption module 308 can also allow the application program to access the content of the requested file without decrypting the encryption file when it is determined that the application program does not need to access the content of the requested file.

FIG. 3 shows computing device 301 having selective decryption module 308 that performs the above-described operations in accordance with certain embodiments of the disclosed subject matter. Computing device 301 may include additional modules, fewer modules, or any other suitable combination of modules that perform any suitable operation or combination of operations.

Interfaces 306, 310, 312, and 314 provide an input and/or output mechanism to communicate over a network. Interfaces 306, 310, 312, and 314 enable communication with other computing devices (e.g., computing device 301), as well as other network nodes in communication network 102. Interfaces 306, 310, 312, and 314 can be implemented in hardware to send and receive signals in a variety of mediums, such as optical, copper, and wireless, and in a number of different protocols some of which may be non-transient.

In some embodiments, a computing device 301, such as server 104, can operate using operating system (OS) software. In some embodiments, the OS software is based on a Linux software kernel and runs specific applications in the server such as monitoring tasks and providing protocol stacks. The OS software allows server resources to be allocated separately for control and data paths. For example, certain packet accelerator cards and packet services cards are dedicated to performing routing or security control functions, while other packet accelerator cards/packet services cards are dedicated to processing user session traffic. As network requirements change, hardware resources can be dynamically deployed to meet the requirements in some embodiments.

In some embodiments, the computing device's software can be divided into a series of tasks that perform specific functions. These tasks communicate with each other as needed to share control and data information throughout the computing device 301. A task can be a software process that performs a specific function related to system control or session processing. Three types of tasks operate within computing device 301 in some embodiments: critical tasks, controller tasks, and manager tasks. The critical tasks control functions that relate to the server's ability to process calls such as server initialization, error detection, and recovery tasks. The controller tasks can mask the distributed nature of the software from the user and perform tasks such as monitoring the state of subordinate manager(s), providing for intra-manager communication within the same subsystem, and enabling inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem includes critical tasks, controller tasks, and manager tasks. Some of the subsystems that run on computing device 301 include a system initiation task subsystem, a high availability task subsystem, a shared configuration task subsystem, and a resource management subsystem.

The system initiation task subsystem is responsible for starting a set of initial tasks at system startup and providing individual tasks as needed. The high availability task subsystem works in conjunction with the recovery control task subsystem to maintain the operational state of computing device 301 by monitoring the various software and hardware components of computing device 301. Recovery control task subsystem is responsible for executing a recovery action for failures that occur in computing device 301 and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

Shared configuration task subsystem can provide computing device 301 with an ability to set, retrieve, and receive notification of server configuration parameter changes and is responsible for storing configuration data for the applications running within computing device 301. A resource management subsystem is responsible for assigning resources (e.g., processor and memory capabilities) to tasks and for monitoring the task's use of the resources.

In some embodiments, computing device 301 can reside in a data center and form a node in a cloud computing infrastructure. Computing device 301, such as server 104, can also provide services on demand. A module hosting a client is capable of migrating from one server to another server seamlessly, without causing program faults or system breakdown. Computing device 301 on the cloud can be managed using a management system.

Computing device 301, such as client device 106, can include user equipment. The user equipment communicates with one or more radio access networks and with wired communication networks. The user equipment can be a cellular phone having phonetic communication capabilities. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard. The user equipment can also keep global positioning coordinates, profile information, or other location information.

Computing device 301, such as client device 106, also includes any platforms capable of computations and communication. Non-limiting examples can include televisions (TVs), video projectors, set-top boxes or set-top units, digital video recorders (DVR), computers, netbooks, laptops, and any other audio/visual equipment with computation capabilities. In some embodiments, computing device 301 is configured with one or more processors that process instructions and run software that may be stored in memory. The processor also communicates with the memory and interfaces to communicate with other devices. The processor can be any applicable processor such as a system-on-a-chip that combines a CPU, an application processor, and flash memory. Computing device 301 can also provide a variety of user interfaces such as a keyboard, a touch screen, a trackball, a touch pad, and/or a mouse. Computing device 301 may also include speakers and a display device in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A method, comprising:
    monitoring a secure file storage area including at least one file using a selective decryption process associated with the secure file storage area, wherein content of each of the at least one file is protected with an encryption;
    detecting a request by an application program for one of the at least one file;
    determining whether the application program needs to access at least a part of the content of the requested file;
    when it is determined that the application program does not need to access the at least a part of the content of the requested file, allowing the application program to access the content of the requested file without decrypting the encryption; and
    when it is determined that the application program does need to access the at least a part of the content of the requested file:
    decrypting the encryption,
    allowing the application program to access the decrypted file content,
    detecting a write-request by the application program for writing the decrypted file content to an unsecure location outside of the secure file storage area, and
    re-encrypting the decrypted file content using the selective decryption process before the file content is written to the unsecure location, wherein the re-encryption of the decrypted file content is performed such that the application program is not aware of the re-encryption of the decrypted file content.

2. The method of claim 1, wherein the application program includes a backup daemon, wherein allowing the application program to access the file content includes providing a copy of the requested file to the backup daemon without decrypting the encryption and wherein the copy of the requested file is backed up to a backup tape.

3. The method of claim 1, wherein the application program includes an electronic-mail (e-mail) application, wherein allowing the application program to access the file content includes providing a copy of the requested file to the email application without decrypting the encryption and wherein the copy of the requested file is attached to an e-mail.

4. The method of claim 1, wherein the application program includes one of (1) a word processing application, (2) an image-processing application, (3) a spreadsheet application, and (4) a multi-media processing application, and wherein the requested file is open and the decrypted file content is displayed.

5. The method of claim 1, wherein the selective decryption process is configured to encrypt content of a file when the file is initially saved in the secure file storage area and wherein the secure file storage area is communicatively coupled to a computing device running the selective decryption process.

6. The method of claim 1, wherein the secure file storage area includes one of (1) one or more file folders, (2) one or more segments of a disk and (3) one or more blocks of memory.

7. The method of claim 1, wherein the selective decryption process includes a file system driver including one of (1) one or more kernel components, (2) one or more user-level application components and (3) a combination of kernel components and user-level application components.

8. The method of claim 1, wherein the secure file storage area is located at a cloud storage client device running the selective decryption process and further comprising receiving, at the cloud storage client device, one or more of the at least one file from a cloud storage server over a communication network.

9. An apparatus, comprising:
    one or more interfaces configured to provide communication with at least one computing device over a network;
    a secure file storage area including at least one file; and
    a processor, in communication with the secure file storage area and the one or more interfaces, configured to run a selective encryption module stored in memory that is configured to:
    monitor the secure file storage area, wherein content of each of the at least one file is protected with an encryption;
    detect a request by an application program for one of the at least one file;

determine whether the application program needs to access at least a part of the content of the requested file;

when it is determined that the application program does not need to access the at least a part of the content of the requested file, allowing the application program to access the content of the requested file without decrypting the encryption; and when it is determined that the application program does need to access the at least a part of the content of the requested file:

decrypt the encryption, allow the application program to access the decrypted file content, detect a write-request by the application program for writing the decrypted file content to an unsecure location outside of the secure file storage area, and re-encrypt the decrypted file content before the file content is written to the unsecure location, wherein the re-encryption of the decrypted file content is performed such that the application program is not aware of the re-encryption of the decrypted file content.

10. The apparatus of claim 9, wherein the application program includes a backup daemon, wherein allowing the application program to access the file content includes providing a copy of the requested file to the backup daemon without decrypting the encryption and wherein the copy of the requested file is backed up to a backup tape.

11. The apparatus of claim 9, wherein the application program includes an electronic-mail (e-mail) application, wherein allowing the application program to access the file content includes providing a copy of the requested file to the email application without decrypting the encryption and wherein the copy of the requested file is attached to an e-mail.

12. The apparatus of claim 9, wherein the application program includes one of (1) a word-processing application, (2) an image-processing application, (3) a spreadsheet application, and (4) a multi-media processing application, and wherein the requested file is open and the decrypted file content is displayed.

13. The apparatus of claim 9, wherein the secure file storage area includes one of (1) one or more file folders, (2) one or more segments of a disk and (3) one or more blocks of memory.

14. A non-transitory computer readable medium having executable instructions operable to cause an apparatus to:

monitor a secure file storage area that is coupled to the apparatus and includes at least one file, wherein content of each of the at least one file is protected with an encryption;

detect a request by an application program for one of the at least one file;

determine whether the application program holds an access privilege for accessing the requested file;

when it is determined that the application program holds the access privilege for accessing the requested file, further determine whether the application program needs to access at least a part of the content of the requested file by checking a list of application programs that need to access the content of the requested file;

when it is determined that the application program is not in the list, allow the application program to access the content of the requested file by providing a copy of the requested file to the application program without decrypting the encryption;

when it is determined that the application program is included in the list:

decrypt the encryption, allow the application program to access the decrypted file content, detect a write-request by the application program for writing the decrypted file content to an unsecure location outside of the secure file storage area, and re-encrypt the decrypted file content before the file content is written to the unsecure location in a way that the application program is unaware of the re-encryption of the decrypted file content; and when it is determined that the application program does need to access the at least a part of the content of the requested file:

decrypt the encryption, allow the application program to access the decrypted file content, detect a second write-request by the application program for writing the decrypted file content to a second unsecure location outside of the secure file storage area, and re-encrypt the decrypted file content using the selective decryption process before the file content is written to the second unsecure location, wherein the re-encryption of the decrypted file content is performed such that the application program is not aware of the re-encryption of the decrypted file content.

* * * * *